United States Patent [19]

Byrd et al.

[11] 4,207,291

[45] Jun. 10, 1980

[54] OZONE REMOVAL FILTER HAVING MANGANESE DIOXIDE COATED THEREON

[75] Inventors: Norman R. Byrd, Villa Park; Reino E. Luoto, Santa Ana, both of Calif.

[73] Assignee: McDonnell Douglas Corporation, Long Beach, Calif.

[21] Appl. No.: 892,976

[22] Filed: Apr. 3, 1978

[51] Int. Cl.$^2$ .................. B01D 1/14; B01J 23/34; C01B 13/08

[52] U.S. Cl. .................. 422/122; 252/471; 423/210; 423/219

[58] Field of Search .................. 21/74 R, 74 A, 53; 23/288 F, 288 FA, 288 FB, 288 FC, 288 R; 423/210 C, 219; 252/471; 422/4, 122, 180, 222; 55/524, 528

[56] References Cited

U.S. PATENT DOCUMENTS

| 2,739,132 | 3/1956 | Riedl | 252/471 |
|---|---|---|---|
| 3,019,197 | 1/1962 | Saunders | 252/471 |
| 3,269,801 | 8/1966 | Boberg et al. | 23/288 F |
| 3,295,918 | 1/1967 | Briggs et al. | 252/471 |
| 3,907,532 | 9/1975 | Roberts | 252/471 |
| 3,993,597 | 11/1976 | Stiles | 252/471 |
| 4,003,854 | 1/1977 | Skviortsov et al. | 252/471 |
| 4,007,118 | 2/1977 | Ciambrone | 23/288 R |
| 4,111,793 | 9/1978 | Kolombos et al. | 252/471 |

FOREIGN PATENT DOCUMENTS

| 50-36387 | 4/1975 | Japan | 252/471 |
|---|---|---|---|
| 51-54083 | 3/1976 | Japan | 252/471 |

OTHER PUBLICATIONS

Rideal; "Ozone"; 9-5-22; p. 135; Constable & Co. Ltd.

*Primary Examiner*—Bradley R. Garris
*Attorney, Agent, or Firm*—Max Geldin

[57] ABSTRACT

Filter for removal of ozone from air, e.g. in aircraft cabins, comprising a porous and preferably light weight and thermally stable substrate, particularly an organic polymer such as polybenzimidazole, containing a film or coating of manganese dioxide. The article can be formed by treating the substrate with a permanganate solution under conditions to reduce the permanganate to $MnO_2$.

19 Claims, 6 Drawing Figures

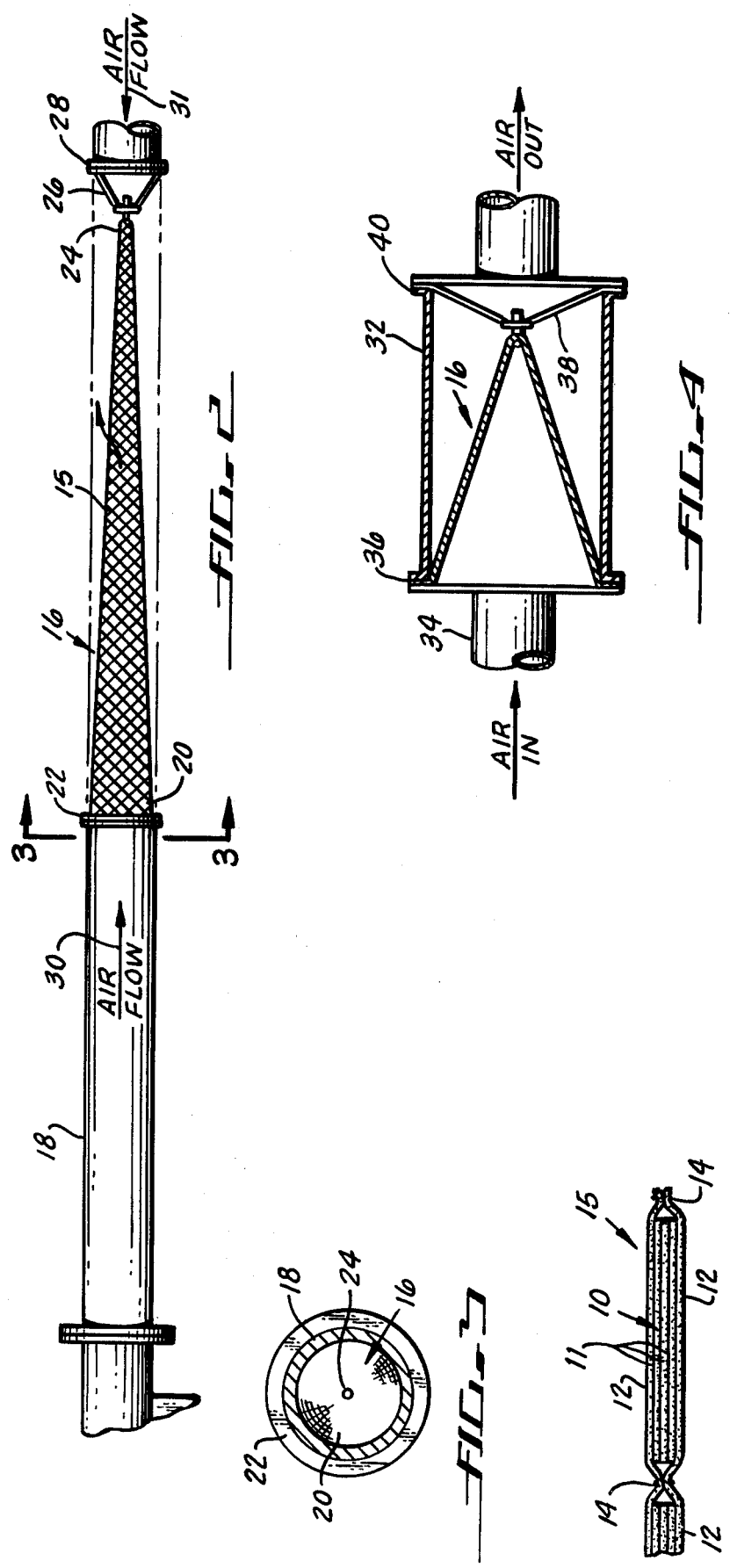

OZONE REMOVAL FILTER HAVING MANGANESE DIOXIDE COATED THEREON

BACKGROUND OF THE INVENTION

This invention relates to the removal of ozone from air by decomposition thereof to oxygen, and is particualrly concerned with a filter for the above purpose.

Current commercial aircraft fly at altitudes where there is ozone present in the atmosphere. Recent interest in ozone removal from aircraft cabins has resulted due to an apparent increase in ozone being ingested into the passenger compartment when planes fly at altitudes as low as 23,000 feet to normal cruise altitudes of 35,000 to 39,000 feet. The ozone laden air is introduced into the aircraft cabin through the air conditioning and pressurization supply ducting. The ozone concentrations thus introduced are sufficiently high to cause some discomfort to the passengers.

To overcome this problem, recent investigations have involved the use of carbon and pelletized catalyst filters to remove the ozone under the above conditions.

Among the various ways known to eliminate ozone contamination from an ambience by decomposition of the ozone into oxygen are catalytic substances including metallic and non-metallic catalysts. Although catalytic systems appear to be the most efficient way to remove ozone from the bleed air or pneumatic ducting air supply system of an aircraft, many of such catalytic substances e.g. in the form of pellets or particles, must be carried in a container or canister, which creates problems with regard to weight as well as affecting the air flow. These materials also have other disadvantages. Thus, for example, the use of a silver coating on a metal substrate is sacrificial, in that the resultant silver oxide is readily removed and lost in the air stream. Although nickel is satisfactory it requires a very clean surface for deposition of the metal.

The following U.S. patents are exemplary of the prior art. U.S. Pat. No. 3,269,801, discloses a system for removing ozone from air, employing pellets or particles of non-metallic catalysts such as manganese dioxide located within a canister. In U.S. Pat. No. 2,980,494, it is noted that manganese dioxide when used in powder form to decompose ozone requires catalyst support pellets to prevent packing of the powder, French Pat. No. 1,436,673 discloses that ozone can be removed from air by passing the air through a layer of active granular substance, such as $MnO_2$. However, as previously noted, such filter systems add undesirable weight to an aircraft, and also present considerable resistance to the flow of air therethrough.

U.S. Pat. No. 3,049,399 discloses that air can be deodorized by passing it through a bed of solid materials treated with potassium permanganate; U.S. Pat. No. 3,019,197 discloses a silver plated screen coated with a potassium permanganate solution which is dried and used to decompose $H_2O_2$; U.S. Pat. No. 3,421,837 discloses the use of permanganate impregnated alumina for deodorizing air. In these patents, which do not relate to ozone removal, the permanganate is the active material, which is reduced to $MnO_2$ as a result of the reaction which takes place.

It is accordingly an object of the present invention to provide an improved system for removal of ozone from air, particularly in aircraft. Another object is the provision of means for efficiently decomposing ozone in an air stream by use of a non-metallic catalyst. A particular object is the provision of a system in the form of a filter, for ozone removal from air employing a substrate containing manganese dioxide as catalyst in a non-powder or non-pellet form, the resulting system being lightweight and resistant to high temperature, and providing minimum resistance to air flow. A still further object is to provide procedure for producing such filter.

SUMMARY OF THE INVENTION

It has been found according to the present invention that the above objects and advantages can be achieved and an efficient system for removal of ozone from air provided, by depositing on the surface of a substrate formed of a porous light weight and preferably thermally stable material, particularly an organic or polymeric material, e.g. polybenzimidazole batting or cloth, a film or coating of manganese dioxide as catalyst for ozone decomposition. Such manganese dioxide film or coating can be deposited on the substrate surface by treatment thereof with a solution of a permanganate, a representative permanganate for this purpose being potassium permanganate. The permanganate reacts with oxidizable material on the surface of the substrate, to oxidize such material and reduce the permanganate, resulting in the formation of a manganese dioxide film on and which is adherant to the substrate surface.

The system of the invention for removal of ozone from air can be placed in the air stream, for example the air duct supply system in an aircraft, for efficiently decomposing the ozone in the incoming air. For this purpose, a particularly preferred ozone removal system according to the invention is in the form of a substrate of a highly thermally stable light weight batting or fabric of an organic or polymeric material, e.g. polybenzimidazole or a chlorinated polyamide, such as the material marketed as Durette, containing an $MnO_2$ film. These latter substrate materials are highly porous, as well as being light weight and thermally stable, and the resulting systems can accordingly be employed as a filter, permitting passage of the ozone-containing air through such filter for removal of ozone, with relatively little resistance to air flow. Such ozone removing filters are much lighter in weight than a carbon or a pelletized catalyst filter, and are very efficient at the supply air temperatures which exist in the low stage bleed air system of an aircraft when ozone is present at high altitudes.

The above substrate materials containing a manganese dioxide film according to the invention can be formed into a bag by positioning a plurality of layers of batting or felt, e.g. of polybenzimidazole, within an outer cloth layer of the same material, and the assembly stitched together and impregnated and coated with $MnO_2$ according to the invention. Such ozone filter conveniently can be formed into a bag, e.g. of conical shape, for placement in the air duct. Alternatively, such $MnO_2$ coated batting or felt can be formed into filter panels similar to common household furnace filters. The density of these battings and fabrics can be varied by compression to suit desired filtration characteristics, with respect to pressure drop or ozone removal efficiency. These ozone filters, such as polybenzimidazole batting containing a manganese dioxide film according to the invention, effectively reduce inlet ozone levels at relatively high inlet air velocity through the filter, and at elevated temperature of the ozone laden air, e.g. 200° to 350° F. Thus, for example a test filter of this type had an ozone removal efficiency in excess of 95% at an inlet air velocity of 550 ft/min and at temperatures in excess of 240° F.

DETAILED DESCRIPTION OF PREFERRED EMBODIMENTS

To obtain the film of manganese dioxide on a substrate of the above type according to the invention, a saturated solution of a permanganate in water is formed, and the substrate is treated or contacted with the solution by any suitable means such as pouring the solution on the substrate or dipping the substrate into the solution. The permanganates which can be used include the permanganates of potassium, sodium, magnesium, calcium and barium, potassium permanganate being preferred. A basic solution of permanganate, e.g. containing sodium carbonate, or an acetone solution of permanganate, also can be used, e.g. solutions saturated with respect to permanganate, in a solution of sodium carbonate or in acetone.

Treatment with the permanganate solution to apply a film or coating of $MnO_2$ on the substrate can be carried out at room temperature or at elevated temperature up to about 70° C. After remaining in contact with the substrate surface for a period of time, usually about 30 to about 90 minutes, the permanganate solution is removed from the substrate, as by pouring it off, the substrate is washed with water to remove permanganate, and the substrate containing the $MnO_2$ coating is then air dried, e.g. in an oven at about 120° C.

As previously noted, the substrates which can be treated according to the invention for application of a manganese dioxide film thereon to produce an efficient ozone filter, are highly porous, preferably light weight, substrates, and preferably having high thermal stability, e.g. up to about 400° C., particularly organic polymers, in the form of batting, felt or cloth. Especially preferred and effective substrates having the above characteristics are polybenzimidazole (PBI), marketed as batting and cloth, polyamide, particularly chlorinated polyamide such as the material marketed as Durette, in the form of batting or cloth, and polyimide. Another effective substrate of this nature are phenolics such as the material marketed as Kynol, a phenolic fiber which is needle punched on polyester. Polyethylene and cellulose (paper) also can be employed, but are of lower thermal stability.

Porous preferably thermally stable and light weight inorganic substrates can also be used. These include glass, graphite and boron fibers in the form of batting or fabric, and woven metal fibers such as aluminum mesh and stainless steel wool.

In order to form an adherant film of manganese dioxide on the surface of the substrate, the surface of the substrate should be capable of being oxidized, or a material should be present on the surface of the substrate which is capable of being oxidized by the permanganate so as to reduce the permanganate to manganese dioxide. Organic materials such as the above noted PBI, Durette, and Kynol and polyimide substrates have an oxidizable surface.

The production of a manganese dioxide film on the above porous light weight substrates, e.g. polybenzimidazole or polyamide, can be further facilitated by first treating the surface of the substrate with an oxidizable organic solution, that is a solution containing one or more organic components which are oxidizable, prior to treatment with permanganate. Organic solutions which can be used for this purpose, are, for example, a dilute solution of ethylene glycol, maleic acid, butyne diol-1,4, abietic acid or glutaraldehyde, in an organic solvent such as n-butanol or toluene. After forming a film of the solution of oxidizable material on the substrate surface, the permanganate solution is applied, the excess permanganate poured off, and the substrate washed and then dried, to leave a thin coating of the brown adherant manganese dioxide.

Treatment of the above substrates initially with the organic solution containing an oxidizable substance such as abietic acid prior to treatment with permanganate solution is optional.

The invention will be more readily understood from the description below of certain preferred embodiments, taken in connection with the accompanying drawing wherein:

FIG. 1 illustrates production of a filter for removal of ozone according to the invention, formed of polybenzimidazole fabric or felt, positioned between outer layers of cloth of the same material;

FIG. 2 illustrates a system including a filter of the type shown in FIG. 1, in the form of a conical bag coated and impregnated with $MnO_2$, positioned in an air duct for treatment of ozone laden air;

FIG. 3 is an end view of the system of FIG. 2, taken on line 3—3 of FIG. 2;

FIG. 4 illustrates a modification of the system shown in FIG. 2, including a separate filter housing;

Figure 6:
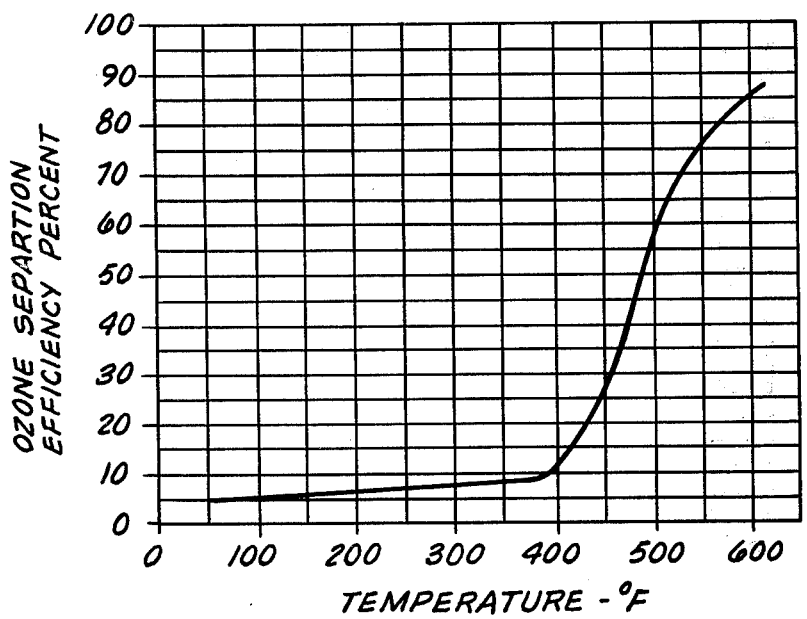
Figure 5:
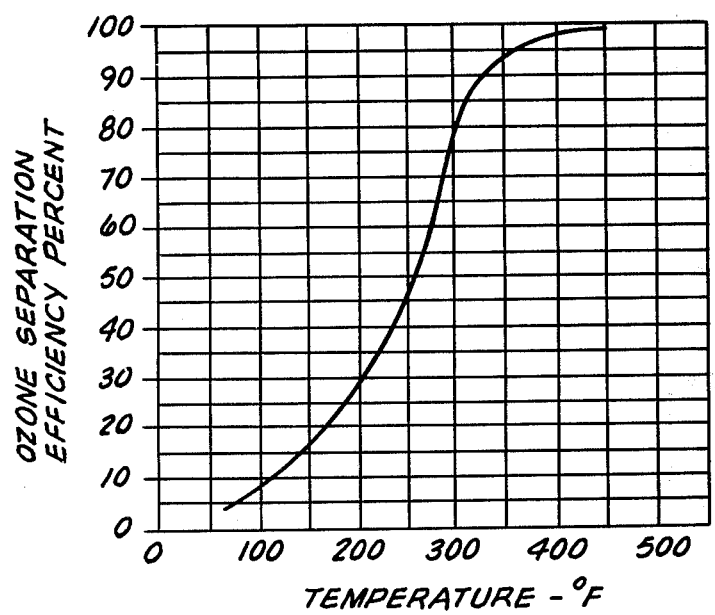

FIG. 5 is a curve illustrating operation of one type of filter according to the invention, for removing and decomposing ozone in air at various temperatures; and FIG. 6 is a curve illustrating the substantially decreased effectiveness of employing as filter for removal of ozone from air, a substrate similar to that used in relation to the operation shown in FIG. 5, but without formation of a manganese dioxide coating thereon.

Referring to FIG. 1, three layers of PBI batting 40-4010-1 at 11 are placed between two outer layers of PBI 40-4010-1 cloth, and the assembly is stitched together as illustrated in FIG. 1. Thus, the assembly 10 of the interior layers of batting 11 and the outer cloth layers 12, are attached together at selected intervals by stitching, as indicated at 14, to form a flexible substrate.

Referring to FIG. 2, the resulting substrate 15 is formed into a conically shaped bag 16, and the bag 16 can be treated by immersion in a solution of potassium permanganate.

The resulting flexible conical bag 16 coated and impregnated with $MnO_2$, and of a thickness, e.g. of about ⅛ inch, is employed as a filter for removal of ozone from air by mounting it in an air duct 18, the larger end 20 of the bag being held in a flange 22, and the small end 24 being connected to a retention truss 26 connected to a second flange 28, so that the conical filter bag 16 is stretched between flanges 22 and 28 axially in the air duct 18.

Air containing ozone, e.g. at an air flow velocity of about 500 ft/min. can be passed through the air duct 18 in the direction indicated by arrow 30, the air passing into the large end of the bag first. If desired, however, the air flow can be in the opposite direction, as indicated by arrow 31.

Referring to FIG. 4, if the air flow velocities in the air duct are large, this can be compensated by increasing the diameter of the filter housing to reduce the velocity through the air filter. Thus, as shown in FIG. 4, there is provided a filter housing 32 of large diameter than the air duct 34. The conical filter bag 16 can then be mounted with its large end held by a flange 36 at one end of the housing 32, with the small end of the bag supported by a truss 38 connected to a flange 40 at the other end of the filter housing 32, so as to maintain the filter bag 16 stretched in position across the filter housing 32.

The following examples illustrate practice of the invention.

EXAMPLE 1

Five layers of polybenzimidazole batting, marketed as 40-4010-1, by Celanese Fiber Marketing Co., in the form of 6 inch discs and having a total thickness of about ⅛ inch were assembled, and such assembly was impregnated and coated with a film of manganese dioxide by dipping it in a saturated potassium permanganate solution which was raised to a temperature between 60° and 70° C. The so-treated batting was kept for about 20 minutes, and cooled, then removed from the permanganate solution. The permanganate solution was poured off and the batting washed with water to remove excess permanganate. The batting was then air dried and placed in a 120° C. oven for 30 minutes. The batting was then cooled, leaving a manganese dioxide coating or film on the batting.

The resulting flexible polybenzimidazole batting assembly containing the $MnO_2$ film was tested as a filter for removing ozone from the air.

The filter was installed in a six inch diameter air line and an ozone generator injected ozone into the air line upstream of the filter. The ozone laden air, containing about 1.2 ppm of ozone was passed through the filter at a velocity of about 300–700 ft/minute, with a pressure drop of about 5–20 inches of water across the filter. Ozone meters monitored the ozone concentrations in the air upstream and downstream of the filter. The air supplied to the filter was heated to various values and ozone filtration or removal efficiencies were obtained at various temperatures.

The test data obtained was plotted, and the resulting curve of this data in FIG. 5 shows that the manganese dioxide coated polybenzimidazole filter was greater than 90% efficient in filtering out ozone when the air temperature of the ozone laden air was in excess of about 325° F.

EXAMPLE 2

Polybenzimidazole batting without any permanganate treatment was tested as a filter for removing ozone by installing an assembly of 5 layers of such batting in a 6 inch diameter air line and an ozone generator injected ozone into the air line upstream of the filter. The ozone laden air containing about 1.2 ppm of ozone was passed through the filter at an air flow rate approximately the same as the air flow rate in Example 1. The air supplied to the filter was heated to various temperatures and the ozone concentrations upstream and downstream of the filter for various air temperatures was measured.

The test data obtained was plotted and the resulting curve of this data in FIG. 6 shows that at air temperatures below 400° F. ozone removal efficiency was less than 10%, and between air temperatures of 400 and 500° F., the ozone removal efficiency of the filter varied between about 10% and about 60%, and at temperatures as high as 600° F., ozone removal efficiency only reached about 85%.

A comparison of the ozone removal efficiency of the PBI filter of this example, containing no manganese dioxide coating, where ozone removal was achieved only by heating the air to very high temperatures, with the ozone removal efficiency of the PBI filter containing $MnO_2$ according to the invention, in Example 1, and shown by the data in FIG. 5, shows the marked effectiveness of the filter of the invention containing an $MnO_2$ coating for removal of ozone from air at substantially lower air temperatures.

EXAMPLE 3

One layer of Durette batting, a chlorinated polyamide marketed by Fire Safe Products of St. Louis, Mo. was placed between two outer layers of Durette (400-11) cloth, and the assembly was stitched together and formed into a conically shaped bag, as illustrated in FIGS. 1, 2 and 3.

The resulting filter bag can be coated and impregnated with $MnO_2$ by treatment with permanganate solution as in Example 1, and of a thickness of about ⅛ inch, can be employed as a filter for removing ozone from air by mounting it in an air duct as illustrated in FIG. 2.

EXAMPLE 4

Fiberglass wool or batting was treated with permanganate solution substantially according to the procedure of Example 1 to form a manganese dioxide coating on the substrate.

The resulting batting can be used as described in Example 1 as a filter for removing or decomposing ozone in ozone laden air at ambient or elevated air temperatures.

Although the above described substrates containing manganese dioxide as a film or coating, or impregnated in the substrate, have been found particularly effective as a filter for removing ozone from air, such filter can also have other applications, such as for removal of other contaminants, odor-forming materials and dirt, from air or other gases.

From the foregoing, it is seen that the invention provides particularly a simple effective filter for removal of ozone from air, formed of readily available materials, and comprising a porous, lightweight and preferably thermally stable fabric, capable of withstanding temperatures up to 400° C., and having a film or coating of manganese dioxide, which can be readily formed on the substrate by the process of treating such fabric with potassium permanganate solutions or modified forms thereof. The ozone filter according to the invention is much lighter in weight than a carbon or a pelletized catalyst filter, and can be formed into a bag through which the ozone laden air passes, or into filter panels. The filter of the invention can be employed in high temperature environments, and is durable and effective over extended periods of operation.

While particular embodiments of the invention have been described for the purpose of illustration within the spirit of the invention, it will be understood that the invention is not to be taken as limited except by the scope of the appended claims.

What is claimed is:

1. A filter effective particularly for removing ozone from air, comprising a substrate formed of a porous light weight material containing a manganese dioxide coating deposited on said substrate from a permanganate solution, said substrate being a member selected from the group consisting of polybenzimidazole, a polyamide, a polyimide, a phenolic polymer, polyethylene, cellulose and derivatives and mixtures thereof.

2. A filter as defined in claim 1, wherein said substrate is in the form of batting or cloth.

3. A filter as defined in claim 1, said substrate being comprised of one or more layers of batting of said material positioned between outer layers of cloth of said material, said manganese dioxide being impregnated into and coated on said batting and said outer cloth layers.

4. A filter as defined in claim 1, wherein said substrate is a thermally stable material.

5. A filter as defined in claim 4, wherein said substrate is polybenzimidazole.

6. A filter as defined in claim 2, wherein said substrate is a chlorinated polyamide.

7. A filter as defined in claim 4, wherein said substrate is in the form of phenolic fibers punched on polyester.

8. A filter as defined in claim 1, said substrate being comprised of one or more layers of batting of said material stitched between outer layers of cloth of said material, and formed into a bag, said manganese dioxide being impregnated into and coated on said batting and said outer cloth layers.

9. A filter as defined in claim 8, wherein said bag is conically shaped.

10. A filter as defined in claim 8, wherein said substrate is polybenzimidazole.

11. A filter as defined in claim 8, wherein said substrate is a chlorinated polyamide.

12. A filter as defined in claim 8, wherein said substrate is in the form of phenolic fibers punched on polyester.

13. Apparatus for removing ozone from air which comprises in combination, an air duct, a filter positioned in said air duct, said filter comprising a substrate formed of a porous lightweight thermally stable material containing a manganese dioxide coating deposited on said substrate from a permanganate solution, said substrate being a member selected from the group consisting of polybenzimidazole, a polyamide, a polyimide, a phenolic polymer, and derivatives and mixtures thereof and means for mounting said filter in said air duct for passage of air containing ozone through said filter.

14. Apparatus as defined in claim 13, including a filter housing in said air duct, said mounting means being disposed in said housing.

15. Apparatus as defined in claim 13, wherein said substrate is in the form of batting.

16. Apparatus as defined in claim 13, said substrate being comprised of one or more layers of batting of said material stitched between outer layers of cloth of said material, and formed into a bag, said manganese dioxide being impregnated into and coated on said batting and said outer cloth layers.

17. Apparatus as defined in claim 16, said bag being conically shaped, and positioned axially in said air duct.

18. Apparatus as defined in claim 17, wherein said batting and said cloth of said bag are polybenzimidazole.

19. Apparatus as defined in claim 17, wherein said batting and said cloth of said bag are a chlorinated polyamide.

* * * * *